United States Patent
Riegl

[11] 3,830,567
[45] Aug. 20, 1974

[54] METHOD AND APPARATUS FOR DISTANCE MEASUREMENT

[75] Inventor: Johannes Riegl, Vienna, Austria

[73] Assignee: Immatra AG, Zurich, Switzerland

[22] Filed: Mar. 15, 1972

[21] Appl. No.: 234,924

[30] Foreign Application Priority Data
Apr. 28, 1971 Austria .............................. 3678/71

[52] U.S. Cl..................... 356/5, 343/7.5, 343/13 R, 343/17.1 R
[51] Int. Cl............................ G01c 3/08, G01s 9/06
[58] Field of Search ........... 356/4, 5; 343/13 R, 7.5, 343/17.1 R; 328/109, 115; 325/326

[56] References Cited
UNITED STATES PATENTS

| | | | |
|---|---|---|---|
| 3,095,541 | 6/1963 | Ashcraft............................ | 343/13 R |
| 3,573,825 | 4/1971 | Westby............................. | 343/13 R |
| 3,624,651 | 11/1971 | Robert et al...................... | 343/13 R |
| 3,650,628 | 3/1972 | Tawfik et al...................... | 343/13 R |
| 3,716,857 | 2/1973 | Le Grand......................... | 343/17.1 R |

Primary Examiner—Malcolm F. Hubler
Assistant Examiner—H. A. Birmiel

[57] ABSTRACT

There is disclosed a range finder operating on the principle of finding the range of an object by measuring the time between transmission of a pulse towards an object and the reception of the reflected pulse. Errors in the range measurement caused by the different half-rise times of reflected pulses of different amplitudes are avoided by using only a reflected pulse of a predetermined constant magnitude as a measuring pulse for range determination. The desired magnitude of the measuring pulse is obtained by altering the power of the transmitter and/or by changing the amplification of the receiver. The use of pulsed laser range finders operating in the infra-red region of the spectrum is referred to for generating pulses as well as other sources of pulsed energy.

12 Claims, 2 Drawing Figures

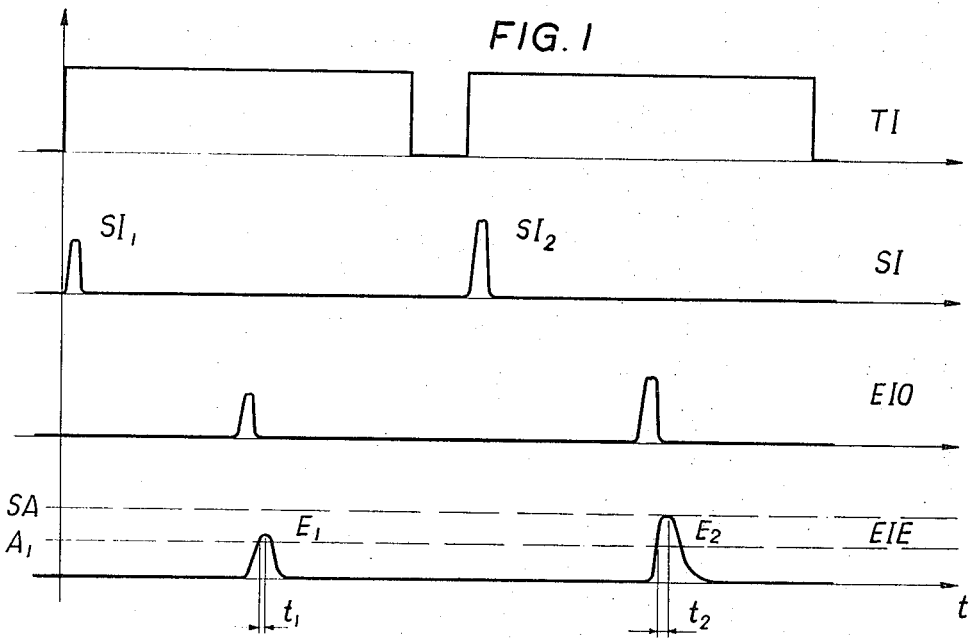
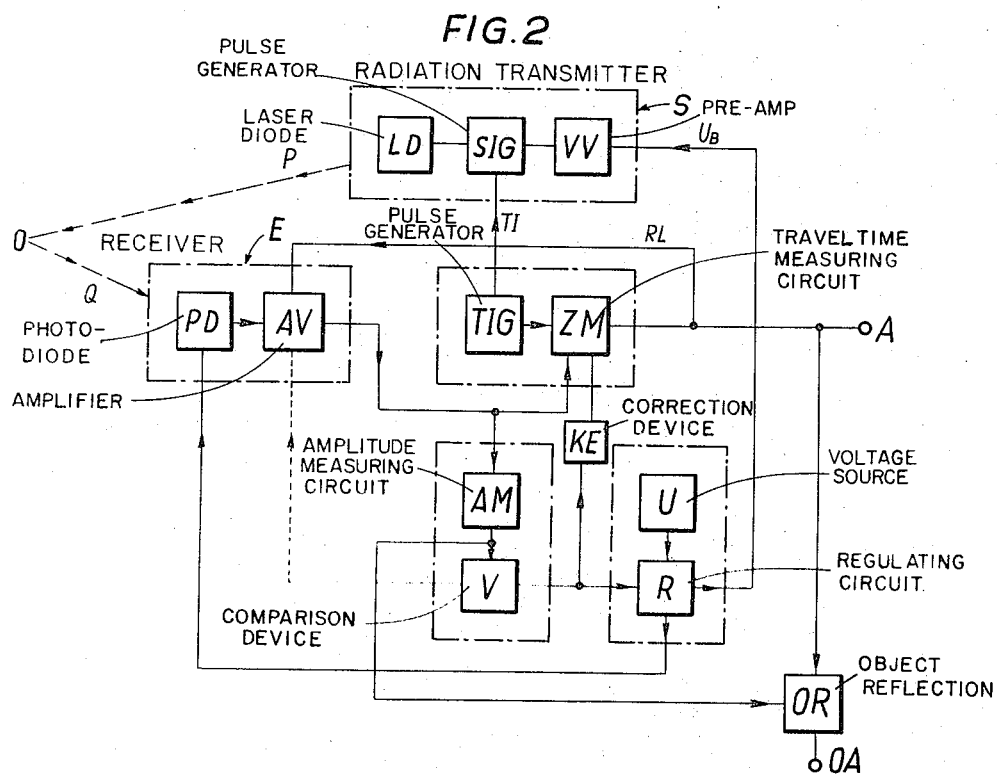

METHOD AND APPARATUS FOR DISTANCE MEASUREMENT

BACKGROUND OF THE INVENTION

The accuracy of distance measurement by pulses depends substantially on the accuracy of defining the moments of time of transmitting and receiving the pulses. Although the time of transmission can naturally be easily defined, the accuracy of defining the time of the reception pulse is usually of the order of magnitude of the rise time of the pulse when the time taken for the rising flank of the pulse to attain a threshold value is utilized for measurement. The preset threshold level at the receiver is a minimum level reached by the rising flank of the reception pulse and is used to define the reception time. As the time taken for a received pulse to attain the threshold value is a function of the peak amplitude of the pulse which varies with the range and reflectivity of the object being ranged, it was hitherto the practice to attempt to reduce the pulse rise time as much as possible in order to improve the accuracy, a reception pulse rise time of 2 ns being required for an accuracy of only ± 15 cm. Apart from the technological expense, this procedure either necessitated the use of special and expensive receiver circuitry or a relatively short maximum range of the apparatus. Although such difficulties could theoretically be reduced by utilizing transmitters with a higher power output, the maximum transmission power output value which is considered safe to the human eye in practice prevents the transmission power output being increased above a specified relatively low value.

SUMMARY OF THE INVENTION

An object of this invention is to improve distance measurement of objects with the aid of pulses of radiation but without excessively increasing the power of the output transmission.

In accordance with one aspect of the invention, there is provided a method of computing the range of an object which reflects a pulse of energy directed towards it, comprising measuring the time interval between the moment of pulse transmission towards the object and the instant that a threshold value is attained by the rising flank of a measuring pulse corresponding the reflected pulse but whose amplitude has been deliberately expanded or diminished to a predetermined magnitude during the course of the measurement, and computing from the measured time interval the range of the object.

In accordance with a second aspect of the invention, there is provided a range finding apparatus comprising a pulse energy transmitter having a directional characteristic and defining a ranging axis, a receiver orientated to pick up echoes of pulses reflected back along the ranging axis from an object being ranged, a comparison circuit in the receiver comparing the amplitude of a received pulse with a predetermined magnitude and providing a corresponding output, a regulating circuit controlled by the comparison circuit output and changing the amplitudes of received pulses in the direction of the predetermined magnitude in order to provide a measuring pulse, a threshold circuit responsive to the instant that the rising flank of a measuring pulse having an amplitude equal to said predetermined magnitude attains a threshold value, and a time-measuring circuit responsive to the moment of transmission of a pulse along the ranging axis and measuring the time interval between said moment and said instant to provide an output determined by the object range.

Thus, it will be appreciated that the invention is based on a completely different principle from that hitherto employed for ranging, namely that the amplitude of the reception pulse must always be maintained at a precisely identical level when a defined threshold level is specified, in order to define the reception time, so that the time from which the range is determined always includes a predetermined constant percentage of the reception pulse rise time. In this way, the accuracy of the reception time depends merely on the accuracy with which the amplitude is regulated to the predetermined magnitude, it being possible to increase such accuracy to a very high degree. Preferably, the transmitter is so arranged that it operates initially with low transmission pulse amplitudes which are regulated by being increased until the amplitude value of the received pulses attains the predetermined magnitude. In this way it is possible to obtain good accurate ranging with a relatively low power consumption, a feature which is important with portable ranging apparatus, quite apart from the desirability of minimizing the mean output power level of the transmitter to avoid risk of injury to persons when using laser beam transmitters at high powers.

In order to obtain a favourable signal to noise ratio it is preferred, during pulse amplitude regulation, that firstly the transmitter power is adjusted within its regulating range and then the receiver is adjusted only after the limits of such regulating range have been reached.

A special advantage of the invention is that it enables correction values to be obtained in order to compensate at the receiver for the affects on range of reflectivity of the object being ranged. It will be appreciated that an error of a defined magnitude will result whenever the amplitude of the received pulse deviates from the predetermined magnitude. For example, if the amplitude of the received pulse is less than the predetermined magnitude, the time of reception will be defined by an amplitude percentage which is higher than justified, as is explained in more detail later. This error thus depends on the amplitude of the received pulse. It is therefore advantageous if a correction value is obtained relative to the amplitude of the received pulses and is taken into account when the distance is defined.

It is also possible to obtain a further measured value by beginning the transmission at a predetermined transmitted pulse amplitude followed by transmitter amplitude adjustment until the predetermined magnitude of received pulse amplitude is reached, the difference in amplitude between the received pulse obtained when transmission began and the predetermined magnitude of received pulse being used to obtain a correction value which is a measure of the object reflectivity.

Preferably in the apparatus of the invention, the receiver is provided with an avalanche diode, the output signal of which is regulated by a regulating device to the predetermined magnitude. However, it is more advantageous if the regulating device drives instead a head amplifier. The regulating device may also control an amplifier in the transmitter as well as in the receiver and it is also possible to control an avalanche diode in the transmitter to obtain the required amplitude regulation. Preferably, the regulating device has two outputs of different voltage levels, one output being connected to the transmitter and the other to the receiver in order to control the transmitter or receiver, respectively, in turn. However, the regulating device may also have three outputs if, for example, the head amplifier as well as the avalanche diode in the receiver is to be regulated in addition to the transmitter.

To obtain a correction value for travel time measurement of the pulse, it is possible for the received pulse amplitude measuring circuit to be connected to the time measuring circuit indirectly, by way of a correction device. Moreover, an object brightness computer may be connected to the output of the amplitude measuring circuit in order to measure the object brightness and allow correction to be made for that also.

IN THE DRAWINGS

The invention will now be described in more detail, by way of example, with reference to the accompanying drawings, in which:

FIG. 1 is a pulse diagram to explain the underlying principle of the invention by means of four waveforms drawn to the same time scale; and, FIG. 2 is a block schematic circuit diagram of a rangefinder, incorporating a pulse transmitter and a pulse receiver.

PREFERRED EMBODIMENT

The accompanying drawings are limited to showing the basic principle of the invention and, block schematically in FIG. 2, the layout of principal parts of a rangefinder designed to utilise the invention. It will be understood that the rangefinder pulse transmitter produces short duration pulses of electromagnetic energy which may be a radio wave or a laser beam or accoustic, preferably supersonic, but as such pulse generators are so well known they do not require detailed description here. One such pulse generator is, for example, described in German specification No. 1,963,559 as laid open to public inspection and which is concerned with a rangefinder which, unlike the present invention, is incapable of measuring ranges with an accuracy of less than 10 centimetres or thereabouts.

Turning first to FIG. 1 which explains the principle of the invention, timing pulses TI, transmitted at regular intervals to a conventional pulse generator, are provided by analogy to the synchronizing pulses described in German Specification No. 1,963,559 as laid open to public inspection. The positive flank of each timing pulse TI is utilized to drive the pulse generator into its transmission mode at which it generates a transmission pulse SI after a brief delay. The transmission pulse may be a sould pulse, but it is more appropriately a electromagnetic pulse, preferably in a range close to visible light. Very efficient and small transmitters are available for the last-mentioned waves, for example it is possible for Ga-As lasers to be employed, which enable narrow focusing of the transmitted infra-red light and have only a low energy consumption.

When utilizing such laser diodes, the transmitted optical transmission pulses SI will have the form illustrated in FIG. 1. The transmission pulses SI are aimed down a ranging axis to strike a distant object to be ranged. After a period of time determined by this distance, a reflected optical input pulse EIO having an amplitude determined to some extent by the object's brightness is received by an optical receiver pointed down the ranging axis. FIG. 1 shows that the amplitude of the optical input pulses EIO is lower than that of the transmission pulse SI.

The optical input pulse EIO is converted, with an unavoidable slight delay, into an amplified electrical pulse EIE available at the output of the receiver. The electrical pulses EIE are then used for the precise determination of the arrival time. To this end a defined threshold level of amplitude $A_1$ is preset at the receiver and a travel time measuring circuit is triggered when the threshold amplitude $A_1$ is exceeded by the electrical input pulse EIE.

FIG. 1 shows sets of pulses in sequence with respect to time, each first transmission pulse $SI_1$ having lower amplitudes than the succeeding transmission pulse $SI_2$. The same applies correspondingly to the electric input pulses $E_1$ or $E_2$ respectively. It will be seen that for a given threshold level $A_1$ the time which elapses between the level $A_1$ being reached to the time at which the corresponding input pulse reaches its maximum amplitude varies in accordance with the actual maximum amplitude of the pulse and this produces an inaccuracy in the travel time measurement. Taking the pulse $E_1$, the time which elapses between the threshold amplitude $A_1$ being reached and the time at which the maximum amplitude of the input pulse is reached amounts to a time $t_1$, whereas the time between the same values being attained in the case of input pulse $E_2$ is a substantially longer time $t_2$. For example, if the threshold amplitude $A_1$ is assumed to be approximately 50 percent of the maximum amplitude of the pulse $E_2$, it is immediately apparent that in the case of the input pulse $E_1$ the amplitude $A_1$ corresponds to a very much greater percentage of the pulse rise than in the case of the pulse $E_2$. In actual fact, 50 percent of the maximum amplitude of the input pulse $E_1$ occurs substantially earlier than the same percentage of the pulse $E_2$ and a lower maximum amplitude is therefore misinterpreted as a later arrival of the pulse and therefore a longer ranging distance. If the rise time of the pulse is known one can measure the value of the maximum amplitude of the input pulse and obtain a correction value whereby the inaccuracy in the measured distance caused by variation in the received pulse amplitude can be compensated.

However, it is not necessary to obtain a correction value if the electrical input pulses EIE are brought to a predetermined magnitude SA because in this case the threshold amplitude $A_1$ will always amount to the same percentage of the maximum amplitude of the input pulse EIE. It is then merely necessary to provide precise amplitude regulation of the input pulse amplitudes in order to achieve a correspondingly high degree of accuracy for the distance measurement.

The electrical input pulses will usually not have the predetermined magnitude of amplitude SA at the beginning of a measurement instead their amplitudes will be greater or smaller depending on the object brightness and its degree of reflectivity along the line of sight. For various reasons it is advantageous to begin pulse transmission with low amplitude transmission pulses which are then increased in amplitude until the electrical input pulses EIE have reached the predetermined magnitude SA. This reduces the mean power output level of the transmitter and ensures that only the minimum amount of transmitter energy necessary for distance measurement is radiated, it being, of course, important that the transmitted energy does not exceed a defined amount in the case of a laser beam which can be dangerous if incident on the eyes of a person or animal.

In FIG. 1 the first input pulse measurements during a rangefinding operation will erroneously indicate longer distances than are actually involved and a time-measuring circuit for measuring the elapsed time between transmission and reception of a pulse can be held switched off or quiescent until the predetermined magnitude SA of input pulses is reached. As this procedure involves a slight loss of energy, it is preferred if a correction value is calculated in the manner described hereinabove from the actual maximum amplitude of the incoming electrical pulse as compared with the predetermined magnitude, and applied to the transmitter or receiver or both to provide the input pulse of this magnitude.

Since, for safety reasons, the transmitter output power of a laser can be increased only to a predetermined level, while in other kinds of transmitters there may be other reasons why the power output is capable of being increased above a certain level, it is advantageous to first increase the transmission power within its regulating range during an initial regulating period and then to readjust the receiver output only when the maximum power limit of such regulating range has been reached. Reference has already been made to the fact that there is a difference between the amplitude of the transmission pulse SI and the amplitude of the optical input pulse EIO, said difference being due to the reflectivity of the object. The reflectivity may be evaluated from the difference between the amplitude of the first electrical signal $E_1$ and the predetermined magnitude SA if the first transmission pulse signal $SI_1$ has a predefined maximum amplitude. It is known that brightness varies inversely proportionally to the square of the distance so that the measured distance must be taken into account when calculating the reflectivity.

Although it is perfectly feasible for the necessary calculations to be performed manually using conventional devices, it is nevertheless advantageous for the individual process steps to be automated. FIG. 2 shows in a block circuit diagram means for achieving this end in a rangefinder.

In the rangefinder, a radiation transmitter S is provided with a laser diode LD which is driven by a transmission pulse generator SIG into its transmission mode to direct a beam of light of short duration along a path P to an object O to be ranged. The reflected light returns along path Q to a receiver E, paths P and Q being, in practice, coincident. The transmission pulse generator SIG is provided with timing pulses TI (FIG. 1) from a timing pulse generator TIG to initiate generation of the pulses. The timing pulse generator TIG also provides a "Start" input to a circuit ZM for measuring the travel time of the pulses. The "start" input defines the beginning of a time measurement period.

The end of the time measurement period is determined by the received pulse which is reflected from the object O whose range is being found and is sensed by the receiver E having a photodiode PD or some other light-sensitive photo-electric transducer on which the reflected pulse is incident. The use of a photodiode, in particular an avalanche diode, offers the advantages of great accuracy and it can, moreover, be controlled to vary the amplitude of its output. The electrical signal obtained from the photoelectric transducer PD corresponds substantially to the signal EIE and is supplied to a head amplifier AV in which it is amplified and supplied to the travel time measuring circuit ZM for calculating the distance. Thus far, leaving aside the control facility of the avalanche diode of the transducer $PD_1$, the receiver utilizes a conventional procedure which results in a signal signifying the measured time being obtained from an output terminal A. The measured time signal may be subsequently either supplied to an indicator (not shown) or — if the illustrated apparatus is used as a rangefinder for a camera — it may be utilised to actuate a control system for focusing the camera.

The output of the head amplifier AV is also fed to an amplitude measuring circuit AM for measuring the amplitude of the signal. The amplitude measuring circuit AM feeds a comparison device V which compares the measured amplitude from circuit AM with a predetermined magnitude of amplitude, namely the set amplitude SA (FIG. 1). This comparison provides a regulating signal which is supplied to a regulating circuit R.

The regulating circuit R provides an output signal voltage $U_B$ which is fed through a preamplifier VV to the signal generator SIG of the transmitter S. The circuit R also provides an output voltage fed to the receiver E and which, if an avalanche diode is used as photoelectric transducer PD, is employed for regulating the diode. In FIG. 2 the regulating circuit R adjusts the voltage obtained from a voltage source U. In this way it is possible for the input signal amplitude to be adjusted automatically. The two illustrated outputs of the regulating circuit R have different voltage levels to ensure that the transmitter S and the receiver E respectively are successively regulated, not simultaneously.

It is necessary to obtain a correction value for the pulse travel time measurement if the amplitude of the output signal obtained from the receiver E deviates from the predetermined magnitude SA (FIG. 1). To achieve this the amplitude measuring circuit AM influences the travel time measuring circuit ZM through a circuit which includes the comparision device V and a correction device KE. The measuring circuit ZM is supplied with a signal, by way of device KE, which is a function of the measured amplitude, this signal acting to reduce the measured time signified by the time measuring circuit ZM in the event of the maximum amplitude of the input signal EIE being lower than the predetermined magnitude SA while if the maximum amplitude of the input signal EIE is greater than the maximum amplitude with respect to the set amplitude value SA, the measured value of the travel time measuring circuit ZM is increased. The amount of change depends substantially on the rise time of the signal EIE.

The output of the amplitude measuring circuit AM is also connected to an object reflection computer OR. As already mentioned, a measure of the reflectivity may be obtained from the difference between the initial maximum amplitude of the input signal EIE and the predetermined magnitude SA if the transmission pulse SI has a predefined amplitude at the beginning of the measuring procedure. However, since object brightness and thus amplitude of the input signal EIE are inversely proportional to the square of the distance it is necessary for the measured distance to be incorporated into the computation. For this reason the object reflectivity computer OR is connected to the output A. The result of the computation will then be obtained at the output of the object reflectivity computer or a defined proportion of this result being used constantly to influence the exposure regulation in a camera or which may be optionally connected to an exposure control of the camera in place of a scene brightness meter.

The rise time constant of the input signal EIE (FIG. 1), that is to say the time which elapses from the beginning of the rise of the said signal until its maximum amplitude is reached and the accuracy attainable thereby is defined substantially by the time constant of the input circuit of the receiver. In general, the time constant will be so selected that an optimum signal-to-noise ratio is obtained even for long distances which are usually subject to a higher noise level. However, this means that longer rise time constants or higher time constants of the input circuit are required for a higher degree of accuracy, that is to say with a more favourable signal-to-noise ratio. These time constants are defined substantially by the capacitance of the diode PD, the input capacitance of the head amplifier AV and by the resistance in the input circuit. The capacitance and resistance may be symbolized by RC networks in a conventional substitution circuit diagram (not shown).

As the accuracy and therefore the rise time of the signal EIE is selected for the longer ranging distances, the accuracy for shorter ranging distances is higher than is necessary. However, since the capacitance of the diode and the input capacitance of the head amplifier cannot be varied it is appropriate to adjust the associated resistances relative to the measured distance so that a steeper rise time is obtained for shorter distances. To this end a repeat conductor RL is provided in the illustrated embodiment (FIG. 2) to connect the output A to the head amplifier AV of the receiver E where it alters a resistance in accordance with the measured distance, that is to say it reduces the value for smaller distances. In this way it is possible for the signal-to-noise ratio to be matched to the distance being ranged as the steeper slope of the rise of input signal EIE results in a shorter rise time and therefore in a greater accuracy of the measurement of the travel time. As a modification the load resistor on the photoelectric transducer PD may also be altered in like manner if desired by an identical conductor provided in addition to the return conductor RL.

Measures of this kind are particularly valuable for the adjustment of optical apparatus, in particular of cameras, since the depth of field of the objectives increases with the distance so that a higher degree of accuracy is required for shorter distances.

The correction device KE supplies an additional correction value to the signal fed through the circuit from the comparison device V to the travel time measuring device ZM, as will now be explained.

The additional correction value is necessary because despite all electronic measures which may be taken, there is a finite probability that the output A may be inaccurate if weak echo signals are present. If the values of a predefined number of measurements are collected, for example in an integrator in a known manner, such procedure will provide a mean value which is influenced by the lowest as well as the highest measured values. In actual fact, this mean value does not always have the greatest probability but merely represents the value which occurs most frequently. It is also naturally possible to compute the statistical probability of each individual measured value for a given statistical distribution by utilizing a relatively complicated circuit. The deviation between mean value and the value which occurs most frequently — such deviation being defined by the construction of the apparatus — can then be measured once and for all, relative to the signal-to-noise ratio, and a corresponding correction value can then be applied by correction device KE to the travel time measuring circuit ZM to influence the mean value formed in the travel time measuring circuit. Any transmission device which is non-linear within a predefined range, for example a suitable resistor, may be employed as the correction device KE. This would give a more accurate result than merely representing the value which occurs most frequently as the mean value as is done above, but the complexity of circuitry involved outweights any advantage gained.

MODIFICATIONS

Various modifications to the illustrated apparatus may be made. For instance, the regulating device R may be formed in or combined with the head amplifier AV of the receiver E instead of being separate. It then is connected to receive the output of the comparison device V by way of the lead shown dotted.

In a further modification the correction device KE is not connected in the path leading from the comparison device to the time measuring circuit ZM but is located in a separate circuit which influences the output of the time measuring circuit in accordance with the output of the amplitude measuring circuit AM or a circuit downstream therefrom.

I claim:

1. A method of computing the range of an object which reflects a pulse of energy directed towards it, comprising the steps of measuring the time interval between the moment of pulse transmission towards the object and the instant that a threshold value is attained by the rising flank of a measuring pulse, corresponding the measuring pulse to the reflected pulse whose amplitude has been deliberately expanded or diminished to a predetermined magnitude by increasing progressively the amplitude of transmitted pulses during the course of the measurement until the amplitude of the received pulse attains the predetermined magnitude, and computing from the measured time interval the range of the object.

2. The method claimed in claim 1, in which the amplitude of the received pulse is compared with the predetermined magnitude and over an initial period the amplitude of the transmitted pulses are increased until a transmission pulse amplitude limit is reached whereafter the receiver is adjusted to produce the measuring pulse of the predetermined magnitude from the received reflected pulse.

3. The method claimed in claim 1, in which the range computation takes into account a correction value which is a function of the range of the object and is computed from the amplitudes of a reflected pulse for a constant amplitude of transmitted pulses.

4. A range finding apparatus comprising a pulse energy transmitter having a directional characteristic and defining a ranging axis, a transmitted pulse amplitude controller in the transmitter, a receiver orientated to pick up echoes of pulses reflected back along the ranging axis from an object being ranged, a comparison circuit means in said receiver for comparing the amplitude of a received pulse with a predetermined magnitude and providing a corresponding output, a regulating circuit controlled by said comparison circuit means and providing an output to said pulse amplitude controller to change the amplitudes of transmitted pulses in the direction of the predetermined magnitude in order to provide a measuring pulse, a threshold circuit means responsive to the instant that the rising flank of a measuring pulse having an amplitude equal to said predetermined magnitude attains a threshold value, a time-measuring circuit responsive to the moment of transmission of a pulse along the ranging axis and measuring the time interval between said moment and said instant, to provide an output determined by the range of the object.

5. Range finding apparatus comprising a pulse energy transmitter having a directional characteristic and defining a ranging axis, a transmitted pulse amplitude controller in the transmitter, a receiver orientated to pick up echoes of pulses reflected back along the ranging axis from an object being ranged, a comparison circuit in the receiver comparing the amplitude of a received pulse with a predetermined magnitude and providing a corresponding output, a regulating circuit controlled by the comparison circuit and providing a first output to the pulse amplitude controller and a second output to the receiver, in which the regulating circuit outputs are provided sequentially to the transmitter and receiver, said regulating circuit outputs having different voltage levels, the transmitter responding to one voltage level which occurs first and the receiver responding to the second voltage level which occurs later, to change the amplitudes of the received pulses in the direction of the predetermined magnitude to provide a measuring pulse, a threshold circuit responsive to the instant that the rising flank of a measuring pulse having an amplitude equal to said predetermined magnitude attains a threshold value, a time measuring circuit responsive to the moment of transmission of a pulse along the ranging axis and measuring the time interval between said moment and said instant, to provide an output determined by the object range.

6. Apparatus as claimed in claim 5, including a correction device connected between the comparison circuit and the time-measuring circuit to average out fluctuations in the amplitudes of successive measuring pulses.

7. Apparatus as claimed in claim 5, in which the ohmic resistance of the receiver is variable and is controlled by the output of the time-measuring circuit to match the time constant of the receiver to the optimum value for receiving signals at the particular range in question.

8. Apparatus as claimed in claim 5, including a correction device connected between the comparison circuit and the time-measuring circuit and having an electrical resistance with a non-linear characteristic.

9. Range finding apparatus comprising a pulsed laser light transmitter defining a ranging axis, a receiver sensing pulses of laser light reflected back along the ranging axis from an object being ranged, a comparison circuit in the receiver comparing the amplitude of a received pulse with a predetermined magnitude and providing a corresponding output, a regulating circuit controlled by the comparison circuit and changing the amplitudes of the transmitted and received pulses in the direction of the predetermined magnitude in order to provide a measuring pulse, a threshold circuit responsive to the instant that the rising flank of a measuring pulse having an amplitude equal to said predetermined magnitude attains a threshold value, a time-measuring circuit responsive to the moment of transmission of a laser pulse along the ranging axis and measuring the time interval between said moment and said instant, and an object reflection computer controlled by the amplitude of the received pulse for a predetermined amplitude of transmitted pulse and which modifies the output of the time-measuring circuit to compensate for reflectivity of the object being ranged.

10. Apparatus as claimed in claim 9, in which the laser provides a beam of light in the infra-red region of the spectrum.

11. Apparatus as claimed in claim 10, in which the intensity of the laser pulses is progressively increased by the regulating circuit during ranging until a predetermined upper safe limit is reached, whereafter further increase of the received pulse amplitude to attain the predetermined magnitude is performed by increasing the amplification of the receiver under the control of the regulating circuit.

12. The apparatus, as set forth in claim 4, wherein said pulse energy transmitter comprises a laser.

* * * * *